June 29, 1965     R. L. SHELTON     3,191,704
DRIVING AND STEERING ASSEMBLY FOR WHEELED VEHICLES
Filed March 25, 1963     6 Sheets-Sheet 3

INVENTOR.
Robert L. Shelton
BY
Hovey, Schmidt, Johnson & Hovey
ATTORNEYS

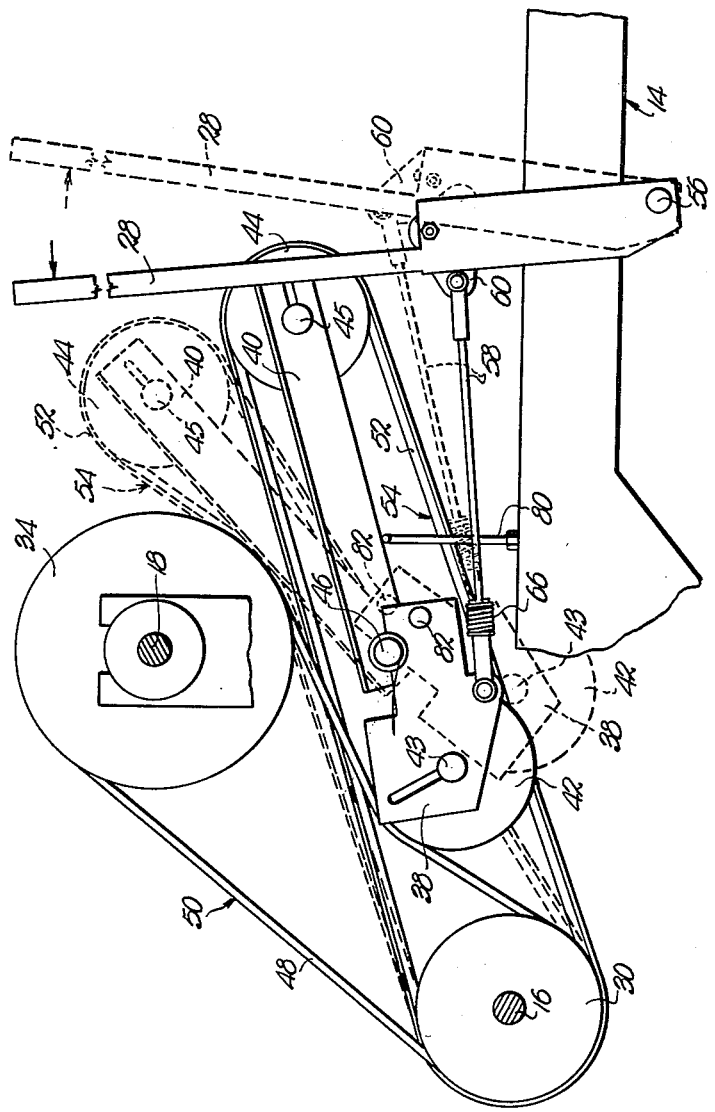

June 29, 1965  R. L. SHELTON  3,191,704
DRIVING AND STEERING ASSEMBLY FOR WHEELED VEHICLES
Filed March 25, 1963  6 Sheets-Sheet 5
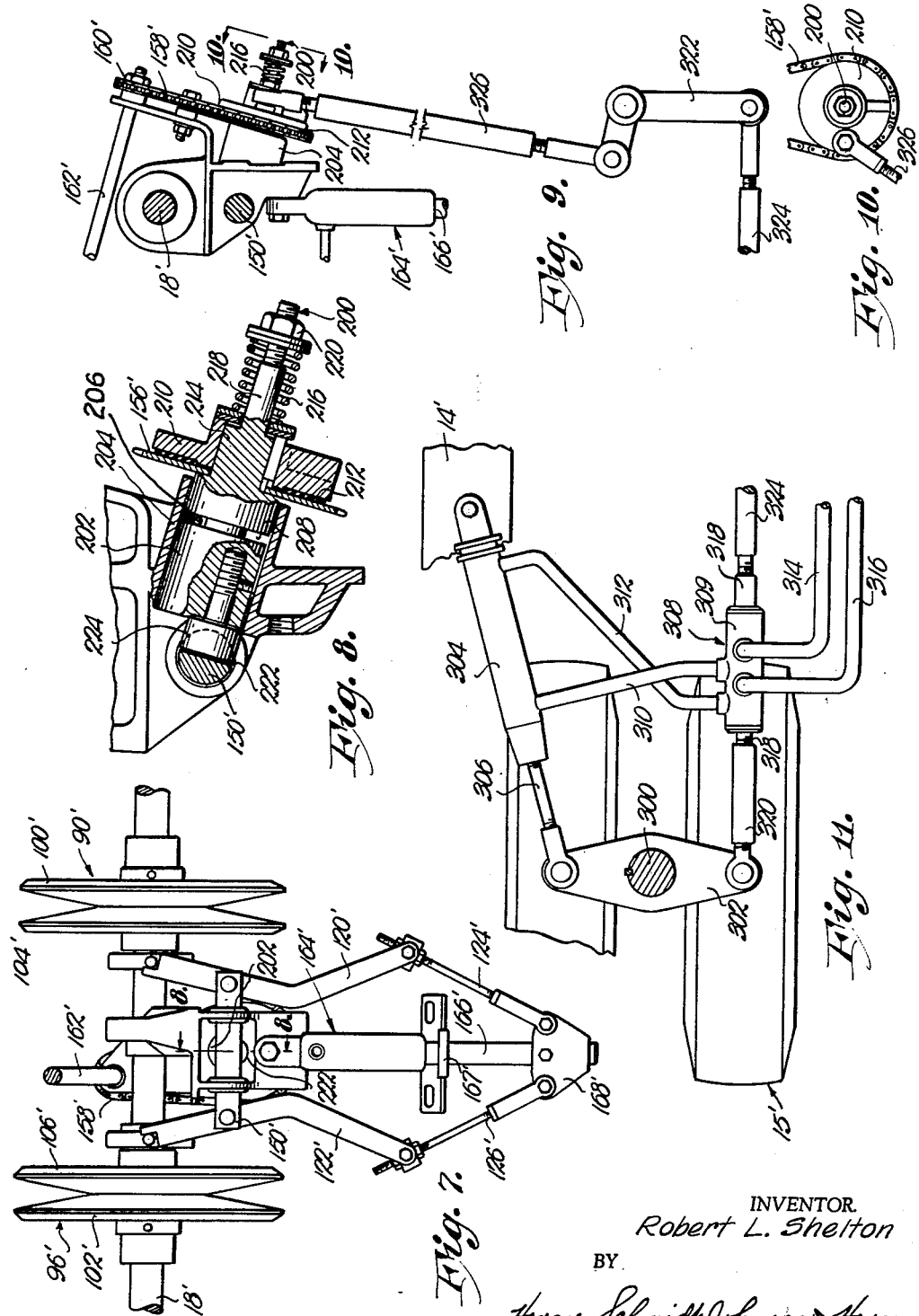
INVENTOR.
Robert L. Shelton
BY
Hovey, Schmidt, Johnson & Hovey
ATTORNEYS.

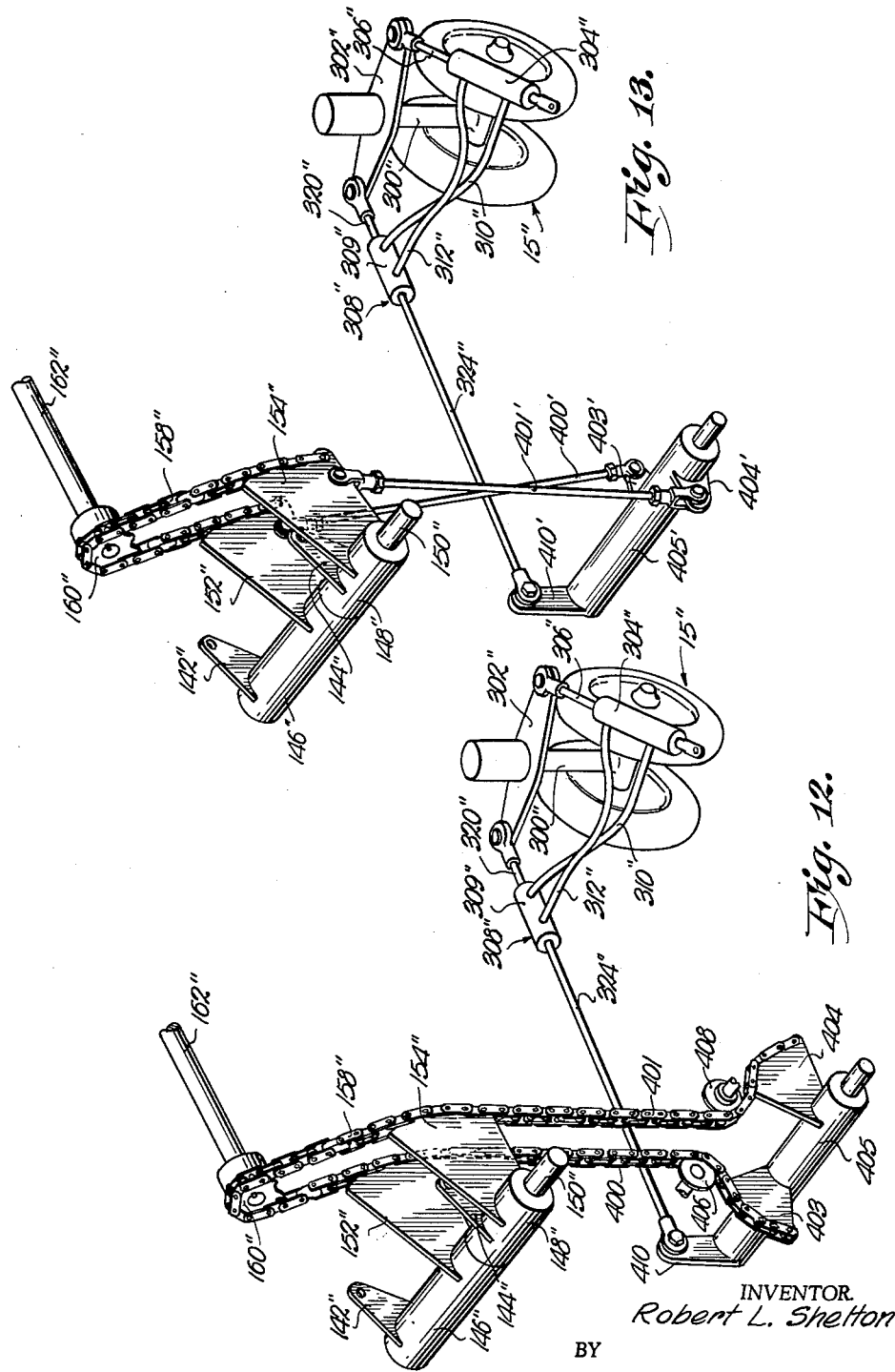

United States Patent Office 3,191,704
Patented June 29, 1965

3,191,704
DRIVING AND STEERING ASSEMBLY FOR
WHEELED VEHICLES
Robert L. Shelton, Hesston, Kans., assignor to Hesston
Manufacturing Co., Inc., Hesston, Kans., a corporation
of Kansas
Filed Mar. 25, 1963, Ser. No. 267,682
19 Claims. (Cl. 180—6.26)

This invention relates to control mechanism for transmitting power from prime movers through shafts and belt and pulley units in conjunction with structure for controlling the direction of rotation of a driven shaft, the entire arrangement being such as to provide speed differentials between a pair of power transmitting shafts, as well as to vary the speeds thereof simultaneously in both directions.

A most important object of the present invention is the provision of a tail wheel steering system operable in conjunction with the same steering arrangement that controls the drive wheels so that turning of the vehicle is quickly and fully sensitive to the touch of the operator regardless of the amount of traction available to either drive wheel and regardless of loads on the vehicle or other factors which tend to oppose the turning effect desired at any given time.

A primary object of the instant invention is the provision of an arrangement of the kind above outlined that is adaptable for use with vehicles having ground-engaging supports such as wheels or endless tracks (for example, crawler tractors) for the purpose not only of driving the supports, but to control their speeds both fore and aft and utilizing the arrangement as a means of steerage.

An important object of my invention is to include in the arrangement a novel clutching system that permits full power shifting from forward to reverse and vice versa without need for bringing the vehicle to a stop for such shifting purposes.

Another object of the instant invention is to provide mechanism of the aforementioned character which utilizes a pair of belt and pulley units for driving a corresponding pair of power transmitting shafts in either of two directions at various differential speeds through a novel control that includes self-contained means of speed variation operating on the principle of altering the effective length of a pair of flexible members forming a part of the basic control.

Still another object of my present invention is to provide manually manipulatable structure for effectively and inexpensively changing the direction of rotation of the power transmitting shafts at the will of the operator, and having simple, releasable lock-in means for holding the structure operable in one direction of rotation of such shafts.

In the drawings:

FIG. 1a is a fragmentary, side elevational view, constituting a continuation of FIG. 1 and showing the tail wheel unit of the vehicle;

FIG. 2a is an enlarged fragmentary, cross sectional view through two of the pulleys shown in FIG. 2 and through their belts;

FIG. 2b is a view similar to FIG. 2a through another pulley of FIG. 2 and through one of the belts shown in FIG. 2a;

FIG. 6 is a fragmentary, side elevational view similar to FIG. 1 showing the position of the manual control structure in fore and aft movement of the vehicle;

FIG. 7 is a view similar in part to FIG. 2 showing a modified form of control for the variable drive belts;

FIG. 8 is an enlarged, fragmentary, cross sectional view taken on line 8—8 of FIG. 7;

FIG. 9 is a fragmentary, vertical, cross sectional view parallel with FIG. 8, presenting a side elevational view of a substantial portion of linkage interconnecting the structure of FIG. 8 with the tail wheel unit;

FIG. 10 is a fragmentary, detailed end view of connecting shaft of said linkage, taken on line 10—10 of FIG. 9;

FIG. 11 is a horizontal sectional view through the support shaft of a tail wheel unit, presenting a plan view of said unit and a portion of the power steering system thereof;

FIG. 12 is a fragmentary, perspective view similar to FIG. 5 illustrating a control for the tail wheel unit shown in FIG. 1a; and FIG. 13 is a view similar to FIG. 12 showing a modified form of control for the tail wheel unit of FIG. 1a.

Figure 1:
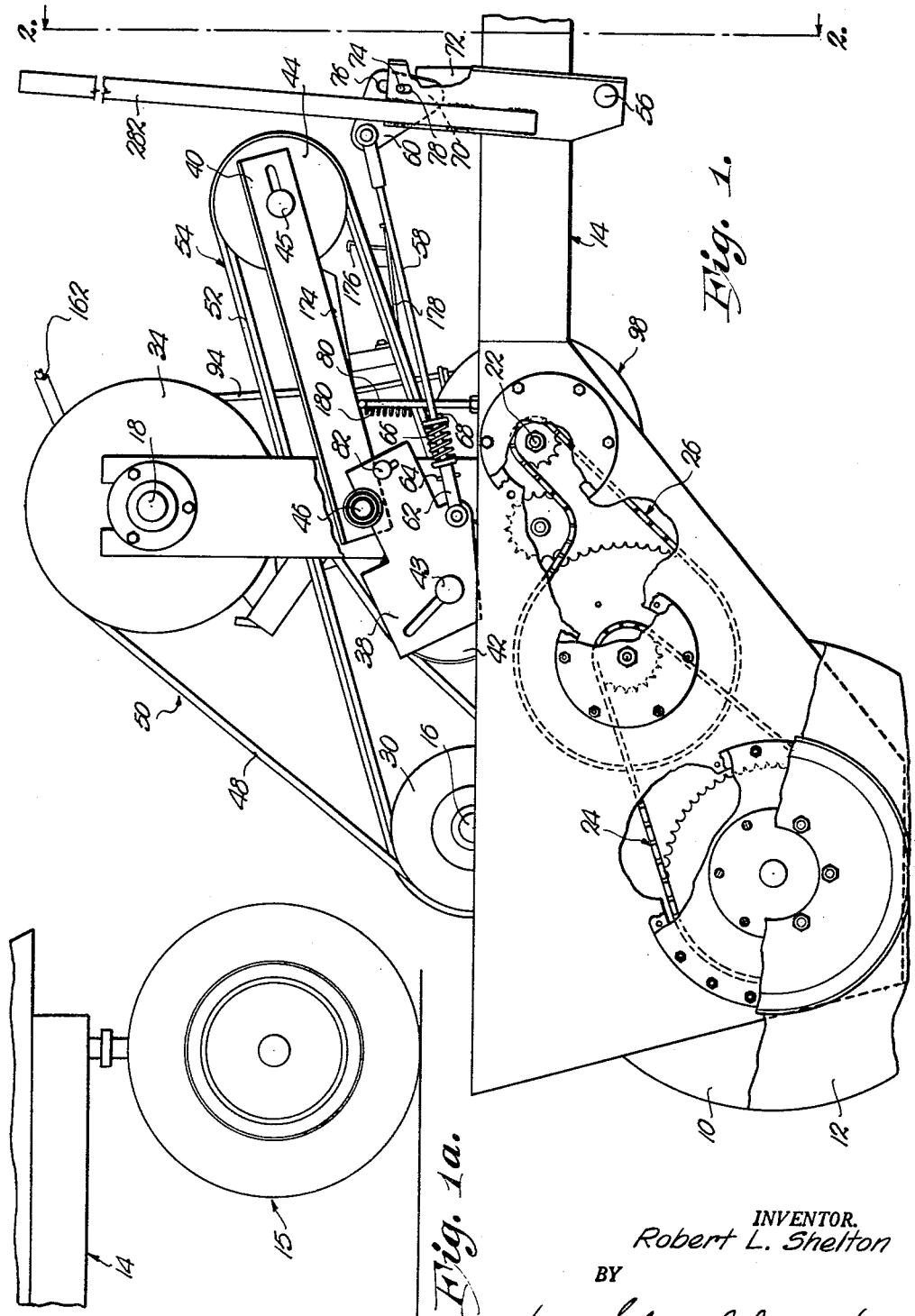
FIGURE 1 is a fragmentary, side elevational view of a wheeled vehicle embodying one form of driving and steering assembly of the instant invention, parts being broken away for clearness.

Referring first to FIGS. 1-6, the front, ground-engaging vehicle drive wheels 10 and 12 supporting chassis 14 are driven by a prime mover such as an internal combustion engine 17 carried by the chassis 14, the output shaft of such prime mover being designated by the numeral 16. Chassis 14 is also supported by a tail wheel unit 15 (see FIG. 1a).

The shaft 16 normally rotating continuously in an anticlockwise direction viewing FIGS. 1 and 6 rotates a driven shaft 18 in either of two directions, the latter of which in turn drives power transmitting shafts 20 and 22 for wheels 10 and 12 respectively. A train of chain and sprocket wheel connections 24 and 26 operably interconnect shaft 22 and wheel 12 as illustrated in FIG. 1, it being understood that a similar arrangement is provided between wheel 10 and its shaft 20.

Figure 2:
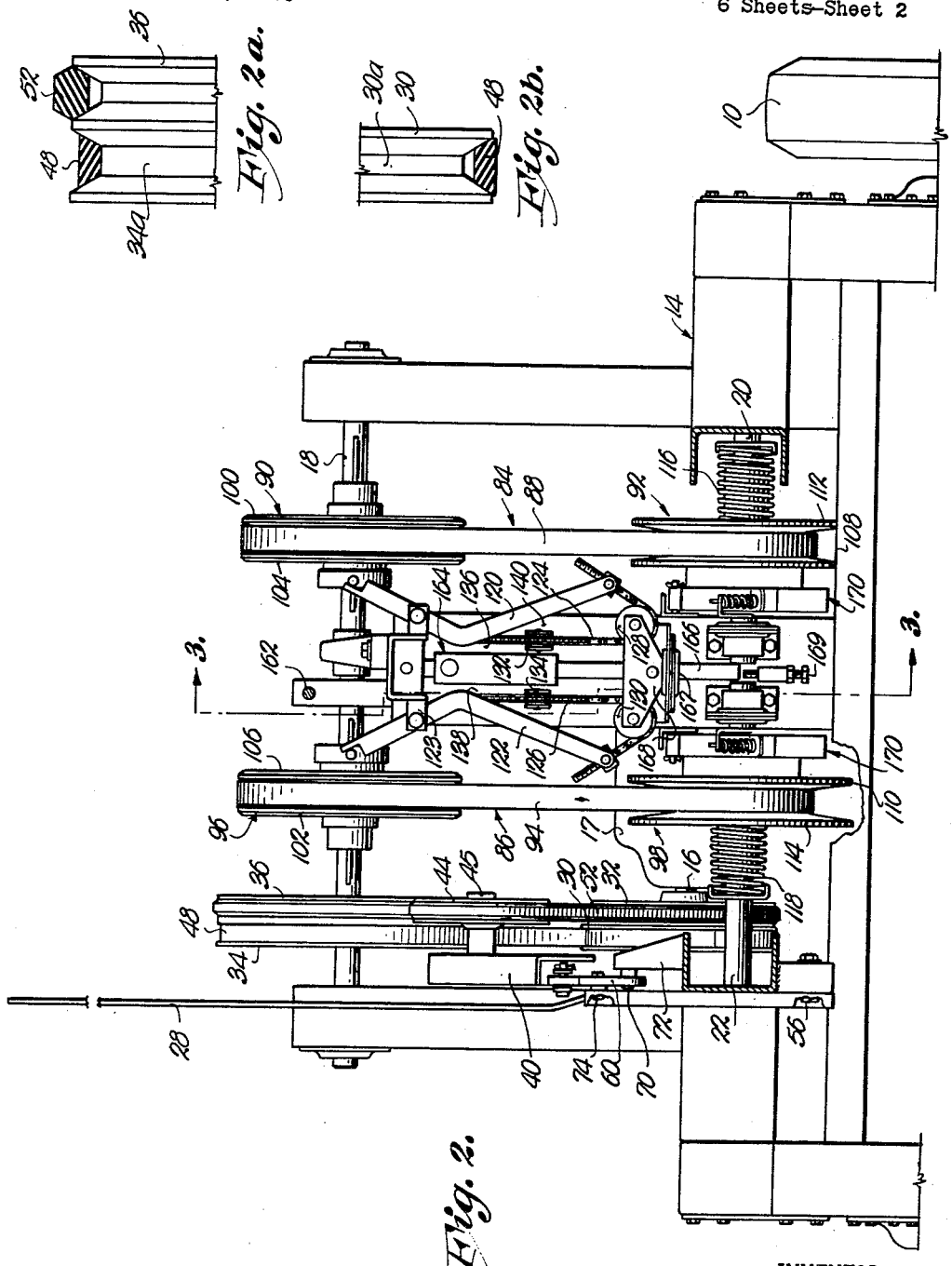
FIG. 2 is a vertical, cross-sectional view looking forwardly and taken on line 2—2 of FIG. 1.
Figure 3:
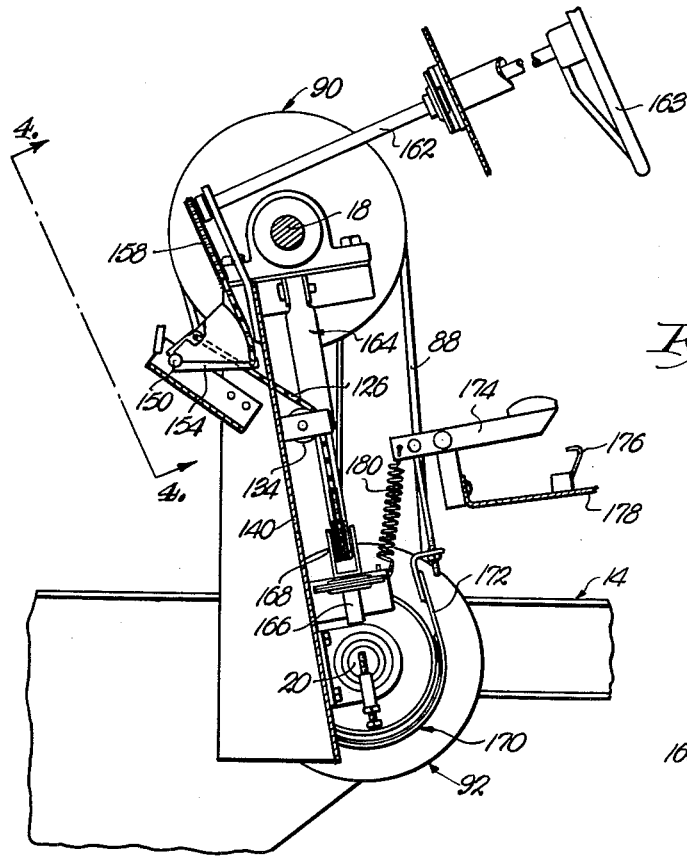
FIG. 3 is a fragmentary, vertical, cross-sectional view taken substantially on irregular line 3—3 of FIG. 2.
Figure 5:
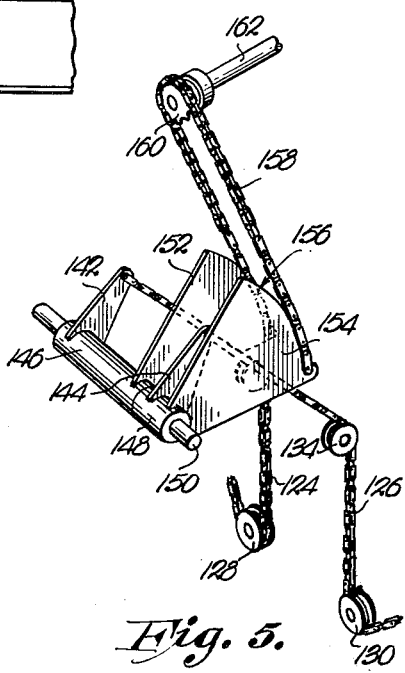
FIG. 5 is a fragmentary, perspective view illustrating a portion of the coupling from the steering shaft to the control arms illustrated in FIG. 2.
Figure 4:
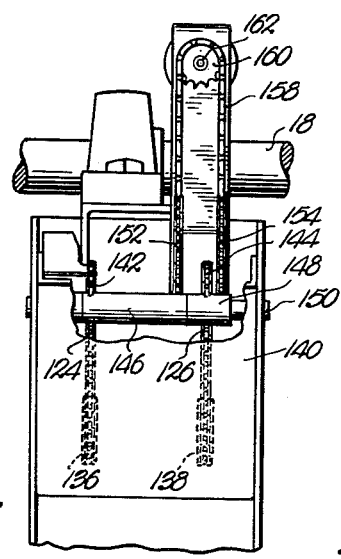
FIG. 4 is a fragmentary, detailed, cross-sectional view taken on line 4—4 of FIG. 3, parts being broken away for clearness.

The structure for manually controlling the direction of travel of the vehicle is illustrated best in FIGS. 1, 2 and 6 and includes a lever 28 shown in a neutral position in FIG. 1, in a position for forward travel by full lines in FIG. 6, and in a position for reverse travel by dash lines in FIG. 6.

Shafts 16 and 18 are provided with a pair of pulleys 30–32 and 34–36, respectively, rigidly secured thereto for rotation therewith. A pair of movable supports 38 and 40 carrying stub shafts 43 and 45 for pulleys 42 and 44, respectively, are separately swingable within vertical planes about a common horizontal axis 46.

A continuous belt 48 trained around the pulleys 30 and 34 presents with such pulleys a first belt and pulley assembly broadly designated by the numeral 50. A belt 52 trained around the pulleys 32 and 44 presents a second belt and pulley assembly broadly designated by the numeral 54. The lever 28, swingable fore and aft about pivot 56, has a rod 58 pivotally interconnecting the same with support 38 through a link 60. The forward end of rod 58 is telescoped within a tube 62 that in turn has a vertical clearance slot (not shown) for a cross pin 64 on rod 58. A spring 66 coiled on rod 58 is interposed between tube 62 and a cross pin 68 through rod 58.

The link 60 is swingable about a pivot 70 on a pedestal 72 and is coupled with the lever 28 by a pin 74 passing through slots 76 and 78 in link 60 and lever 28 respectively. The support 40 normally rests on a standard 80 but is swung therefrom by the support 38 for idler pulley 42 when the support 38 is swung in an anticlockwise direction to move a pin 82 on support 38 against the support 40.

The manual control structure that includes the lever 28 as just above described operates in the following manner:

When the lever 28 is in the position shown in FIG. 1 neither of the belts 48 or 52 is tight; hence the shaft 16 rotates idly without driving shaft 18 in either direction. However, when lever 28 is swung forwardly about pivot 56, the bottom of the slot 78 engages the pin 74, exerting a forward swinging movement to the toggle link 60 until pin 74 strikes the top of the slot 76. This operates to push the rod 58 forwardly, thereby swinging the support 38 clockwise to move the idler pulley 42 against the outer surface of the belt 48. This permits continuous forward travel of the vehicle even though the operator releases his grip on the lever 28.

When the lever 28 is pulled rearwardly the over-center lock of toggle 60 is easily broken, and when the lever 28 is pulled to the neutral position shown in FIG. 1, the tension on belt 48 is released and shaft 18 no longer rotates with shaft 16 in the same direction therewith.

For reverse travel, the lever 28 is pulled rearwardly to the dash line position shown in FIG. 6, pin 74 moving to the bottom of slot 78 and toward the top of slot 76, the pull on support 38 from rod 58 being through pin 64 and tube 62.

Swinging of the support 38 clockwise moves the pin 82 against the support 60, swinging the latter off the standard 80 to the dash line position shown in FIG. 6. This brings the outer surface of the belt 52 into engagement with the secondary pulley 36, causing pulley 44 to rotate in the same direction as pulley 30, but causing the pulley 36 and therefore the shaft 18, to rotate clockwise and, therefore, oppositely to the direction of rotation of shaft 16.

As a matter of safety, no lock-in as above described has been provided for the reverse direction; hence, the operator must hold the lever 28 in the dash line position shown in FIG. 6 during the entire time he desires to travel rearwardly.

The mechanism for operably interconnecting the shafts 20 and 22 with the shaft 18, and for providing manual control thereof, is illustrated in FIGS. 2–5.

A pair of belt and pulley units 84 and 86 join the shaft 18 with the shafts 20 and 22, respectively, unit 84 having a continuous belt 88 trained around pulleys 90 and 92 and unit 86 having a continuous belt 94 trained around pulleys 96 and 98.

Pulleys 90 and 96 are provided with sections 100 and 102, respectively, that are connected with the shaft 18 for rotation therewith and sections 104 and 106, respectively, that also rotate with the shaft 18 but are slidable therealong toward and away from their corresponding rigid sections 100 and 102.

Similarly, pulleys 92 and 98 have sections 108 and 110, respectively, that are rigid to corresponding shafts 20 and 22, together with sections 112 and 114, respectively, that rotate with, but slide along corresponding shafts 20 and 22. Springs 116 and 118 coiled about shafts 20 and 22, respectively, yieldably bias sections 112 and 114 toward their corresponding rigid sections 108 and 110.

Arms 120 and 122, swingable on a stationary member 123, and provided for units 84 and 86, respectively, operate to shift the sections 104 and 106 toward the sections 100 and 102 against the action of springs 116 and 118 when the lower ends of the arms 120 and 122 are drawn toward each other, it being noted in FIG. 2 that the sections 104 and 106 are each essentially at one end of their paths of travel with the pulleys 90 and 96 fully retracted and the pulleys 92 and 98 fully separated.

The means for exerting a pull on the arms 120 and 122 alternately is in the nature of flexible members such as chains 124 and 126 that extend from the lower ends of arms 120 and 122 beneath rollers 128 and 130, thence upwardly over rollers 132 and 134 and through slots 136 and 138 in panel 140, terminating at their opposite ends in a connection with cranks 142 and 144.

Cranks 142 and 144 extend laterally from sleeves 146 and 148 on a shaft 150 that is in turn carried by panel 140.

Laterally extending wings 152 and 154 on sleeves 146 and 148 are provided with arcuate, outermost edges 156 along which a flexible device, such as a chain 158, is partially coiled. The chain 158 is trained around a sprocket wheel 160 on the lowermost and forwardmost end of shaft 162 on steering wheel 163, the terminal ends of the chain 158 being rigid to the wings 152 and 154 adjacent the lowermost ends of the arcuate edges 156 thereof.

The operation of the mechanism shown in FIGS. 2–5 as just above described is as follows:

Oscillation of the steering shaft 162, and therefore the sprocket wheel 160, pulls alternately on the wings 152 and 154 through the chain 158 to in turn oscillate the sleeves 146 and 148. This swings the cranks 142 and 144 to alternately pull on the chains 124 and 126.

Manifestly, when, for example, the shaft 162 is rotated in a direction to pull on the arm 120, the pulley section 104 will shift toward the pulley section 100, thereby compressing spring 116. At the same time, chain 126 will be released so that the spring 118 operates to cause the pulley section 106 to shift away from the pulley section 102. This simply means that the speed of rotation of shaft 20, and therefore its corresponding ground wheel 10, will be increased, and the speed of the shaft 22 with its corresponding wheel 12, will be reduced.

Assuming then, that the lever 28 is in the full line position shown in FIG. 6, the vehicle will execute a turn to the left because of the decreased speed of the wheel 12 over the wheel 10. Rotation of the steering shaft 162 to the right will have the opposite effect, causing the vehicle to turn to the right.

The fore and aft speed of the vehicle is controlled by varying the effective lengths of the chains 124 and 126 and this is accomplished by raising and lowering the rollers 128 and 130 that engage the bights of the chains 124 and 126. Manifestly, any of a number of suitable mechanisms could be provided for raising and lowering rollers 128 and 130. However, I have chosen for illustration a fluid piston and cylinder assembly 164 that has its piston stem 166 connected to a crosshead 168, the latter of which carries rollers 128 and 130.

A ram guide 167 keeps the hydraulic cylinder assembly 164 from swinging from side to side, and a high speed limit stop 169 limits the ram stroke.

Through use of a valve control (not shown) accessible to the operator, the assembly 164 may be controlled. When the crosshead 168 is moved downwardly, arms 120 and 122 are drawn toward each other at their lower ends, thereby shifting the pulley sections 104 and 106 apart toward a maximum speed fore or aft as the case may be. Conversely, when the piston stem 166 is retracted, the springs 116 and 118 will operate to cause the minimum speed of the vehicle in either direction, depending upon the position of the lever 28.

It now becomes clear that a mechanically controlled rod or the like might well be substituted for the assembly 164 to control the movement of crosshead 168 and that such rod could in turn be controlled by many differing types of linkage or the like.

Noteworthy at this juncture is the fact that the steering shaft 162 remains operable for the purpose of guiding the vehicle throughout all of the adjusted positions of the crosshead 168 which means, therefore, that turns can be executed left or right, fore or aft, at speeds selected by the operator, depending upon the position of the crosshead 168 along its vertical path of travel.

Each of the shafts 20 and 22 is provided with a brake 170 whose band 172 is actuated by a foot pedal 174 that may in turn be held locked by a latch 176 (on the floor board 178 of the vehicle) against the action of spring 180.

It is also noteworthy that the control system is so arranged that all connecting links, both right and left hand, are always under tension and there is, therefore, no free play in the steering wheel 163. This is true even as the variable drive belts 88 and 94 wear; the self-adjusting steering linkage does not require attention for slight wearing of these belts. The resultant advantage is instant response to the operator's touch on the steering wheel 163.

As illustrated in FIGS. 2a and 2b, pulley 34 is provided with a wide groove 34a for belt 48, whereas a standard groove 30a is provided in pulley 30 for belt 48.

Belt 48 contacts all three sides of the groove 34a and has very little wedging action as it engages pulley 34; however, belt 48 has a definite wedging action as it engages pulley 30 because it engages only the opposed, inclined sides of the groove 30a. The result of this arrangement is two-fold:

First: As the belt 48 is engaged by the clutching mechanism (tightened between pulleys 30 and 34 as above described) there is sufficient force to cause belt 48 to wedge in the groove 30a before belt 48 can grip the three sides of groove 34a; therefore, belt 48 can be engaged under heavy load and not be burned because the heat caused by friction is absorbed by the entire length of belt 48.

If the groove 34a were of the same nature as groove 30a it would have sufficient capacity to grip belt 48 ahead of pulley 30. All of the heat generated during clutch engagement, especially under heavy load, would be absorbed by the contact area of belt 48 on pulley 30.

Second: The wide groove 34a provides for much smoother clutch engagement since there is no grabbing action between belt 48 and pulley 34.

In the embodiment of my invention shown in FIGS. 7 to 11 inclusive, parts comparable to those previously described are designated by the same reference numerals, suitably primed.

Referring first to FIGS. 7–9, control arms 120' and 122' are pivotally connected with crosshead 168' by extensible (adjustable) links 124' and 126', but fluid piston and cylinder assembly 164' (hydraulic ram) is coupled with crosshead 168' through piston stem 166' (within guide 167') substantially the same as in FIG. 2.

Arms 120' and 122' are shifted laterally as a unit by a reciprocable member in the nature of a transverse steering shaft 150' which is reciprocated along a path parallel to shaft 18' and which swingably supports arms 120' and 122'. Shaft 150' serves, therefore, as the fulcrum for arms 120' and 122'.

Steering wheel shaft 162' has its sprocket wheel 160' connected with sprocket wheel 156' by a continuous chain 158'. Oscillatory control structure includes an inclined steering control shaft 200 having a length 202 of large diameter rotatable in a rigid sleeve 204 and held in place by a roll pin 206 extending into a grease-receiving groove 208 within shaft length 202.

A steering clutch element or pressure plate 210, a torque limiting clutch 212 and the sprocket wheel 156' are mounted on a smaller diameter, intermediate length 214 of shaft 200, but only the plate 210 is keyed to shaft 202 for rotation therewith. A spring 216, coiled on a reduced diameter length 218 of shaft 200, yieldably holds sprocket wheel disc 156' and clutch disc 212 (of frictionable material) clamped between plate 210 and shaft length 202, nut 220 permitting adjustment of the tension of spring 216.

Shaft 150' has a slot 222 which receives an offset cam roller or eccentric 224 mounted on shaft length 202. When shaft 200 is rotated, roller 224 shifts the shaft 150' to move the arms 120' and 122'. This opens one set of variable drive pulleys 90'–96' and closes the other in the same amount, thus providing differential speeds between drive wheels 10 and 12.

The speed control principle is the same in this embodiment as in FIGS. 1–6 except that simplification has been provided because steering is accomplished at the zone of the fulcrum points of arms 120' and 122' on shafts 150'. In FIGS. 1–6, both steering and speed changes are accomplished at the lowermost leverage ends of 120 and 122, requiring a substantial amount of chain linkage 124–126.

As hydraulic ram 164' is extended, links 124' and 126' pull the lower ends of arms 120' and 122' together to force the floating halves 104' and 106' together to provide for higher speeds.

Links 124' and 126' are also used to provide initial adjustment of the transmission. With roller 224 in its control position, links 124'–126' are adjusted to obtain proper spacing of pulleys 90'–96' so that the vehicle will travel straight and so that the variable speed coverage will be adequate. The clutch (parts 156', 210 and 212) prevents damage to the mechanism by too much pressure from the steering wheel 163 When the vehicle is not moving, rotation of shaft 162' will result in slippage of disc 156' rather than rotation of shaft 200 and possible damage to the parts that are actuated by shaft 150'.

In the modification of FIGS 7–11, tail wheel steering is also provided to afford better vehicle stability on hillsides and to assure high speed safety. Loss of traction in the drive wheels 10 and 12 on sides of hills is overcome by a steering linkage between tail wheel unit 15' and the shaft 200.

Oscillatory shaft 300 for the tail wheel support 15' is vertically disposed (since no caster wheel lead is needed) and has a steering arm 302 rigid thereto. A steering cylinder 304 connected to chassis 14' has its piston rod 306 pivotally coupled with one end of arm 302, and an in-line, hydraulic steering valve 308 couples with cylinder 304 through flexible fluid lines 310 and 312. Obviously, as valve 308 controls the flow of fluid in lines 310 and 312 to and from cylinder 304, rod 306 is reciprocated to swing arm 302 and rotate shaft 300. Valve body 309, rigid to chassis 14, is in turn coupled with the hydraulic pump (not shown) by flexible fluid lines 314 and 316.

A valve spool 318 extending through body 309 has an extensible link 320 that pivotally connects with the opposite end of arm 302. Spool 318 is also pivotally connected with a swingable crank 322 by an extensible link 324. Still further, another extensible link 326 pivotally interconnects plate 210 and crank 322. The lands (not shown) of spool 318 within valve body control the fluid flow between lines 310–312 and 314–316 in the customary manner.

It is now apparent that as steering shaft 162' is rotated to steer the wheels 10–12 it simultaneously steers the tail wheel unit 15'. Oscillation of plate 210 is transmitted to link 326, crank 322, link 324 and spool 318 to shift the latter in body 309. This either places line 310 into communication with line 314 and line 312 into communication with line 316 or it places line 310 into communication with line 316 and 312 into communication with line 314, depending on the direction of movement of spool 318. As a result, rod 306 swings arm 302 in one direction or the other until, because of such swinging of arm 302, spool 318 is shifted to block line 314 and 316 or reverse the fluid flow through valve 308.

After making the initial traction steering adjustments as described above for the links 124'–126', the tail wheel steering linkage 320–324–326 is adjusted so that the unit 15' is straight ahead.

Pressure plate 210 is common to both steering systems and the geometry of tail wheel linkage 320–322–324–326 is such as to provide coordination between the systems.

In the event that if sufficient force is used on the steering wheel shaft to cause the disc 156' to slip, the phasing of the two systems is not disturbed.

If the oil supply for the power steering for unit 15' should fail, the spool 318 becomes a solid link between links 320 and 324 and steering of unit 15' is not effected.

In the embodiments of my invention shown in FIGS. 12 and 13, parts comparable to those previously described are designated by the same reference numerals, suitably double-primed. In both of these two embodiments, essentially the same steering wheel control is employed for the traction drive wheels as in FIGS. 1–6. And, essentially the same power steering assembly is provided as is shown in FIG. 11.

In FIG. 12, chain 158" is provided with stretches 400 and 401 that extend downwardly beyond wings 152" and 154" to connect in much the same manner with extensions 403 and 404 that are in turn rigid to a shaft 405. Idlers 406 and 408 serve to keep chain 158" in line, to take up slack and provide proper wrap around the extensions 403 and 404. Arm 410, rigid to shaft 405, is pivotally coupled with link 324", all to the end that steering of tail wheel 15" is responsive to rotation of steering wheel shaft 162".

In FIG. 13, rods 400' and 401' pivotally connect wings 152" and 154" with extensions 403' and 404' rigid to shaft 405', that also has arm 410' secured thereto, with the same result as in FIG. 13.

Having thus described the invention, what is claimed as new and desired to be secured by Letters Patent is:

1. In mechanism of the kind described:
   a pair of shafts;
   a pulley on each shaft respectively, each pulley having a pair of sections;
   a continuous belt trained around the pulley between the sections;
   means rigidly securing one section of each pulley to its shaft for rotation therewith;
   means securing the other section of each pulley to its shaft for rotation therewith and for movement toward and away from its corresponding rigid section;
   resilient means yieldably biasing said other section of one of the pulleys toward its rigid section;
   a flexible member operably coupled at one end thereof with said other section of the other pulley for moving the same toward its rigid section against the action of said resilient means when a pull is exerted on the member adjacent the opposite end thereof and as the effective length of the member is varied, said member having a bight; and
   means engaging the member to define said bight and being movable along the length of said member to change the position of the bight with respect to the ends of the member and thereby vary the effective length of the member betwen the last-mentioned means and the other section of the other pulley.

2. In mechanism of the kind described:
   a pair of shafts;
   a pulley on each shaft respectively, each pulley having a pair of sections;
   a continuous belt trained around the pulley between the sections;
   means rigidly securing one section of each pulley to its shaft for rotation therewith;
   means securing the other section of each pulley to its shaft for rotation therewith and for movement toward and away from its corresponding rigid section;
   resilient means yieldably biasing said other section of one of the pulleys toward its rigid section;
   a rotatable element;
   a flexible member operably interconnecting said element and said other section of the other pulley for moving the same toward its rigid section against the action of said resilient means upon rotation of the element in one direction to exert a pull on the member and as the effective length of the member is varied, said member having a bight; and
   means engaging the member to define said bight and being movable along the length of said member to change the position of the bight with respect to the ends of the member and thereby vary the effective length of the member between the last-mentioned means and the other section of the other pulley.

3. In mechanism of the kind described:
   a pair of shafts;
   a pulley on each shaft respectively, each pulley having a pair of sections;
   a continuous belt trained around the pulleys between the sections;
   means rigidly securing one section of each pulley to its shaft for rotation therewith;
   means securing the other section of each pulley to its shaft for rotation therewith and for movement toward and away from its corresponding rigid section;
   resilient means yieldably biasing said other section of one of the pulleys toward its rigid section;
   a rotatable element;
   a rotatable control;
   a flexible device operably interconnecting the control and the element for rotating the latter in one direction when the control is rotated;
   a flexible member operably interconnecting said element and said other section of the other pulley for moving the same toward its rigid section against the action of said resilient means upon rotation of the element in said one direction to exert a pull on the member and as the effective length of the member is varied, said member having a bight; and
   means engaging the member to define said bight and being movable along the length of said member to change the position of the bight with respect to the ends of the member and thereby vary the effective length of the member between the last-mentioned means and the other section of the other pulley.

4. In mchanism of the kind described:
   a pair of shafts;
   a pulley on each shaft respectively, each pulley having a pair of sections;
   a continuous belt trained around the pulleys between the sections;
   means rigidly securing one section of each pulley to its shaft for rotation therewith;
   means securing the other section of each pulley to its shaft for rotation therewith and for movement toward and away from its corresponding rigid section;
   resilient means yieldably biasing said other section of one of the pulleys toward its rigid section;
   a rotatable element;
   a rotatable control;
   a flexible device operably interconnecting the control and the element and partially coiled on the latter for rotating the latter in one direction when the control is rotated to unwind the device;
   a flexible member operably interconnecting said element and said other section of the other pulley for moving the same toward its rigid section against the action of said resilient means upon rotation of the element in said one direction to exert a pull on the member and as the effective length of the member is varied, said member having a bight; and
   means engaging the member to define said bight and being movable along the length of said member to change the position of the bight with respect to the ends of the member and thereby vary the effective length of the member between the last-mentioned means and the other section of the other pulley.

5. In mechanism of the kind described:
a pair of belt and pulley units having shafts supporting the pulleys thereof, each unit including:
    a pair of pulleys, each pulley having a pair of sections, a continuous belt trained around the pulleys between the sections, means rigidly securing one section of each pulley to its shaft for rotation therewith, means securing the other section of each pulley to its shaft for rotation therewith and for movement toward and away from its corresponding rigid section,
    resilient means yieldably biasing said other section of one of the pulleys toward its rigid section, and
    a flexible member operably coupled at one end thereof with said other section of the other pulley for moving the same toward its rigid section against the action of said resilient means when a pull is exerted on the member adjacent the opposite end thereof and as the effective length of the member is varied, said member having a bight; and
means engaging the members to define said bights and being movable along the lengths of said members to change the positions of the bights relative to respective ends of the members and thereby vary the effective lengths of the members between the last-mentioned means and the respective sections of said other pulleys.

6. In mechanism of the kind described:
a pair of belt and pulley units having shafts supporting the pulleys thereof, each unit including:
    a pair of pulleys, each pulley having a pair of sections, a continuous belt trained around the pulleys between the sections, means rigidly securing one section of each pulley to its shaft for rotation therewith, means securing the other section of each pulley to its shaft for rotation therewith and for movement toward and away from its corresponding rigid section,
    resilient means yieldably biasing said other section of one of the pulleys toward its rigid section, and
    a flexible member operably coupled at one end thereof with said other section of the other pulley for moving the same toward its rigid section against the action of said resilient means when a pull is exerted on the member adjacent the opposite end thereof and as the effective length of the member is varied, said member having a bight;
means engaging the members to define said bights and being movable along the lengths of said members to change the positions of the bights relative to respective ends of the members and thereby vary the effective lengths of the members between the last-mentioned means and the respective other sections of said other pulleys; and
means connected with the members for exerting a pull on each member while releasing the pull on the other member.

7. In structure of the kind described,
a prime mover shaft, a driven shaft, and a pair of stub shafts;
a movable support for each stub shaft respectively;
a first belt and pulley assembly interconnecting the prime mover shaft and the driven shaft;
a secondary pulley on the driven shaft;
a second belt and pulley assembly interconnecting the prime mover shaft and one of the stub shafts;
an idler pulley on the other stub shaft;
means for moving the support of said other stub shaft in a direction to move said idler pulley against the belt of said first assembly to tighten the same whereby to drive the driven shaft in one direction; and
means responsive to the movement of said idler pulley away from the belt of the first assembly for moving the other support and thereby shift said second assembly into driving relationship to said secondary pulley to drive the driven shaft in the opposite direction, said other support being disposed within the path of travel of the support of said other stub shaft as the idler pulley is moved away from the belt of the first assembly whereby said other support is engaged and moved by said support of the other stub shaft.

8. In combination with a vehicle having a pair of drive wheels and a tail wheel, mechanism for driving the drive wheels and for steering the vehicle comprising:
shiftable steering structure;
a driven shaft;
a control unit for each drive wheel respectively, each unit including:
    a power transmitting shaft operably coupled with a corresponding drive wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;
control structure operably coupled with said steering structure;
means operably connecting said apparatuses with said control structure for shifting the shiftable sections of the first pulleys toward their rigid sections alternately as the steering structure is shifted; and
means operably connecting said control structure with said tail wheel for steering the latter as the steering structure is shifted.

9. In combination with a vehicle having a pair of drive wheels and a tail wheel, mechanism for driving the drive wheels and for steering the vehicle comprising:
a steering shaft;
a driven shaft;
a control unit for each drive wheel respectively, each unit including:
    a power transmitting shaft operably coupled with a corresponding drive wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;
reciprocable control structure;
means operably connecting said apparatuses with said structure for shifting the shiftable sections of the first pulleys toward their rigid sections alternately as said structure is reciprocated;
means operably connecting said structure with said tail wheel for steering the latter as the structure is reciprocated; and
clutch means interconnecting the steering shaft and said structure for controlling the latter as the steering shaft is manipulated.

10. In combination with a vehicle having a pair of ground-engaging, drive supports and a ground-engaging, tail support, mechanism for driving the drive supports and for steering the vehicle comprising:
- a steering shaft;
- a driven shaft;
- a control unit for each drive support respectively, each unit including:
    - a power transmitting shaft operably coupled with a corresponding drive support, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;
- reciprocable control structure having an eccentric and a clutch element;
- a reciprocable member coupled with said eccentric for reciprocation thereby;
- linkage coupled with said element for actuation thereby;
- means operably connecting said apparatuses with said member for shifting the shiftable sections of the first pulleys toward their rigid sections alternately as the member is reciprocated;
- means operably connecting said linkage with said tail support for steering the latter as the linkage is actuated; and
- means coupling the steering shaft with said element for controlling said structure as the steering shaft is manipulated.

11. In combination with a vehicle having a pair of ground wheels, mechanism for driving the wheels, for varying the speeds of rotation of the wheels, and for steering the vehicle comprising:
- a steering shaft;
- a driven shaft;
- a control unit for each wheel respectively, each unit including:
    - a power transmitting shaft operably coupled with a corresponding wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and a swingable arm coupled with the shiftable section of the first pulley for shifting the same toward its rigid section against the action of said spring-loading means;
- reciprocable control structure having an eccentric and a clutch element;
- a reciprocable member coupled with said eccentric for reciprocation thereby;
- means pivotally mounting said arms on the member for reciprocation therewith and swinging movement relative thereto;
- means operably connecting said element with the steering shaft for reciprocating the member to shift the shiftable sections of the first pulleys toward their rigid sections alternately as the steering shaft is manipulated to reciprocate said structure; and
- means coupled with said arms for swinging the latter on the member to simultaneously shift the shiftable sections of the first pulleys toward their rigid sections.

12. In mechanism of the kind described:
- a pair of units each having a pulley, a sheave, and a belt connecting its pulley with its sheave;
- shafts supporting the pulleys and sheaves, each pulley having a section rigid to its shaft and a section movable on its shaft, each movable section having resilient means yieldably holding it biased toward the corresponding rigid section, each sheave having a part rigid to its shaft and a part movable on its shaft;
- means for moving one movable part toward its rigid part and simultaneously moving the other movable parts away from its rigid part, and for moving said other movable part toward its rigid part and simultaneously moving said one part away from its rigid part; and
- means for moving the movable parts simultaneously toward their rigid parts, and for moving the movable parts simultaneously away from their rigid parts;
- a vehicle supporting said units and provided with first, second and third ground-engaging supports;
- means operably connecting said first and second supports to corresponding shafts of said pulleys for actuation thereby, said third support being steerable; and
- steering means carried by said vehicle and coupled with the first-mentioned means for actuating the latter, said third support being provided with means operably coupled with said steering means for steering the third support as the steering means is actuated.

13. In combination with a vehicle having a pair of drive wheels and a tail wheel, mechanism for driving the drive wheels and for steering the vehicle comprising:
- a rotatable steering shaft;
- a driven shaft;
- a control unit for each drive wheel respectively, each unit including:
    - a power transmitting shaft operably coupled with a corresponding drive wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;
- a flexible member operably coupled with said steering shaft;
- means operably connecting said apparatuses with said member for shifting the shiftable sections of the first pulleys toward their rigid sections alternately as the steering shaft is rotated; and
- means operably connecting said member with said tail wheel for steering the latter as the steering shaft is rotated.

14. In combination with a vehicle having a pair of drive wheels and a tail wheel, mechanism for driving the drive wheels and for steering the vehicle comprising:
- a rotatable steering shaft;
- a driven shaft;
- a control unit for each drive wheel respectively, each unit including:
    - a power transmitting shaft operably coupled with a corresponding drive wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;
- a flexible member operably coupled with said steering shaft;

mechanism operably connecting said apparatuses with said member for shifting the shiftable sections of the first pulleys toward their rigid sections alternately as the steering shaft is rotated; and linkage operably connecting said mechanism with said tail wheel for steering the latter as the steering shaft is rotated.

15. The invention as set forth in claim 14 wherein said linkage is extensible.

16. The invention as set forth in claim 14 wherein said tail wheel is provided with a reciprocable shaft, said linkage including a fluid piston and cylinder assembly coupled with said shaft of the tail wheel for rotating the latter when the cylinder is actuated, and valve means responsive to the reciprocation of the steering shaft for actuating said assembly.

17. The invention as set forth in claim 16 wherein said shaft of said tail wheel is provided with a pair of circumferentially spaced arms extending outwardly therefrom, said assembly being connected to the outer end of one of the arms, said valve means having a body rigid to the vehicle and a shiftable portion coupled to the outer end of the other arm.

18. The invention as set forth in claim 17 wherein is provided an extensible link connecting said shiftable portion to said other arm.

19. In combination with a vehicle having a pair of drive wheels and a tail wheel, mechanism for driving the drive wheels and for steering the vehicle comprising:

shiftable steering structure;

a driven shaft;

a control unit for each drive wheel respectively, each unit including:

a power transmitting shaft operably coupled with a corresponding drive wheel, a first pulley on the driven shaft, a second pulley on the power transmitting shaft, each pulley having a section rigid to its shaft and a section shiftable along its shaft but rotatable therewith, a belt trained around the pulleys between the sections, means spring-loading the shiftable section of the second pulley toward its rigid section, and apparatus coupled with the shiftable section of the first pulley for shifting the same toward its rigid section against the action of said spring-loading means;

control structure operably coupled with said steering structure;

means operably connecting said apparatuses with said control structure for shifting the shiftable sections of the first pulleys toward their rigid sections alternately as the steering structure is shifted;

means operably connecting said control structure with said tail wheel for steering the latter as the steering structure is shifted; and means coupled with said apparatuses for simultaneously shifting said shiftable sections of the first pulleys toward their rigid sections.

References Cited by the Examiner

UNITED STATES PATENTS

| | | | |
|---|---|---|---|
| 650,516 | 5/00 | Molas et al. | 180—6.38 |
| 1,160,537 | 11/15 | Siddall | 74—220 |
| 2,595,229 | 5/52 | Curtis | 180—6.66 X |
| 2,667,232 | 1/54 | Woolley | 180—79.3 |
| 2,677,432 | 5/54 | Ronning | 180—6.66 X |
| 2,882,753 | 4/59 | Pakosh | 180—6.2 X |
| 2,924,994 | 2/60 | Adee | 74—220 X |
| 2,930,246 | 3/60 | Johnson et al. | 74—220 |
| 2,936,840 | 5/60 | White | 180—6.66 |
| 3,052,311 | 9/62 | Leedom | 180—6.66 |

A. HARRY LEVY, *Primary Examiner.*